US012598282B2

(12) United States Patent
    Aizawa

(10) Patent No.:    US 12,598,282 B2
(45) Date of Patent:        Apr. 7, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Michio Aizawa, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 18/544,512

(22) Filed: Dec. 19, 2023

(65) Prior Publication Data

US 2024/0244174 A1      Jul. 18, 2024

(30) Foreign Application Priority Data

Jan. 17, 2023    (JP) ................................. 2023-004979

(51) Int. Cl.
    H04N 13/00        (2018.01)
    G06T 19/20        (2011.01)
    G06V 10/25        (2022.01)
    H04N 13/279       (2018.01)

(52) U.S. Cl.
    CPC ........... H04N 13/279 (2018.05); G06T 19/20 (2013.01); G06V 10/25 (2022.01); G06T 2219/2016 (2013.01)

(58) Field of Classification Search
    None
    See application file for complete search history.

(56) References Cited

U.S. PATENT DOCUMENTS

| 11,825,063 | B2 | 11/2023 | Aizawa | |
| 2018/0352215 | A1* | 12/2018 | Iwakiri | ................ H04N 13/282 |
| 2020/0258288 | A1* | 8/2020 | Ito | ........................... G06T 7/194 |

FOREIGN PATENT DOCUMENTS

JP        2010-183302 A      8/2010

* cited by examiner

*Primary Examiner* — Martin Mushambo
(74) *Attorney, Agent, or Firm* — Carter, DeLuca & Farrell LLP

(57)        ABSTRACT

An image processing apparatus: obtain information on a virtual viewpoint to generate a virtual viewpoint image, the virtual viewpoint image being an image of an object viewed from the virtual viewpoint, the object included in an image capturing region of an image capturing apparatus; obtain enlarged three-dimensional shape data representing the object in which at least a part of regions is greater than that of normal three-dimensional shape data generated based on images obtained by image capturing by the image capturing apparatus; and generate the virtual viewpoint image based on the enlarged three-dimensional shape data in a case where a visual field represented by the information is a panoramic visual field.

20 Claims, 14 Drawing Sheets

```
{
    "viewpoint": {
        "position": [-40.0, 0.0, 2.0],
        "rotation": [180.0, 0.0, 0.0],
        "zoom": 24
    },
    "foreground": {
        "scale"   : 7.0
        "proportion": 0.2
    }
}
```

FIG.5

IMAGE PROCESSING APPARATUS, IMAGE PROCESSING METHOD, AND STORAGE MEDIUM

BACKGROUND

Field

The present disclosure relates to a technique of generating a virtual viewpoint image.

Description of the Related Art

There has been a technique of generating a virtual viewpoint image, which is an image viewed from a virtual viewpoint. The virtual viewpoint image allows a viewer to browse a scene of sports and the like from various angles, and thus it is possible to provide higher realistic sensations than a normal captured image does.

Incidentally, in the sports broadcasting, in order to allow the viewer to check the positions and the formation of the players on the field on which the sport is played, an image obtained by image capturing so as to include the entire field is used in some cases.

Japanese Patent Laid-Open No. 2010-183302 discloses a method of indicating the position of a player on a field by arranging a graphic of the player on a graphic representing the entire field based on an image obtained by performing image capturing to include the entire field.

In a case where the player on the field is represented by a graphic to indicate the positions of the players on the entire field as disclosed in Japanese Patent Laid-Open No. 2010-183302, the viewer cannot check the facial expression of the player and the line of sight of the player.

Additionally, it is also possible to consider to use a virtual viewpoint image including the entire field to indicate the positions of the players on the entire field. However, the player is displayed small on such a virtual viewpoint image, and it is difficult for the viewer to check the facial expressions and the lines of sight of the players.

SUMMARY

An image processing apparatus of the present disclosure: obtain information on a virtual viewpoint to generate a virtual viewpoint image, the virtual viewpoint image being an image of an object viewed from the virtual viewpoint, the object included in an image capturing region of an image capturing apparatus; obtain enlarged three-dimensional shape data representing the object in which at least a part of regions is greater than that of normal three-dimensional shape data generated based on images obtained by image capturing by the image capturing apparatus; and generate the virtual viewpoint image based on the enlarged three-dimensional shape data in a case where a visual field represented by the information is a panoramic visual field.

Further features of the present disclosure will become apparent from the following description of exemplary embodiments with reference to the attached drawings.

BRIEF DESCRIPTION OF THE DRAWINGS

FIG. 5 is a diagram illustrating an example of a format of a parameter set of virtual viewpoint information and deformation information.

DESCRIPTION OF THE EMBODIMENTS

Details of the technique of the present disclosure are described below based on embodiments with reference to the appended drawings. Note that, configurations described in the embodiments below are merely an example, and the technique of the present disclosure is not limited to the illustrated configurations.

Embodiment 1

Figure 1:
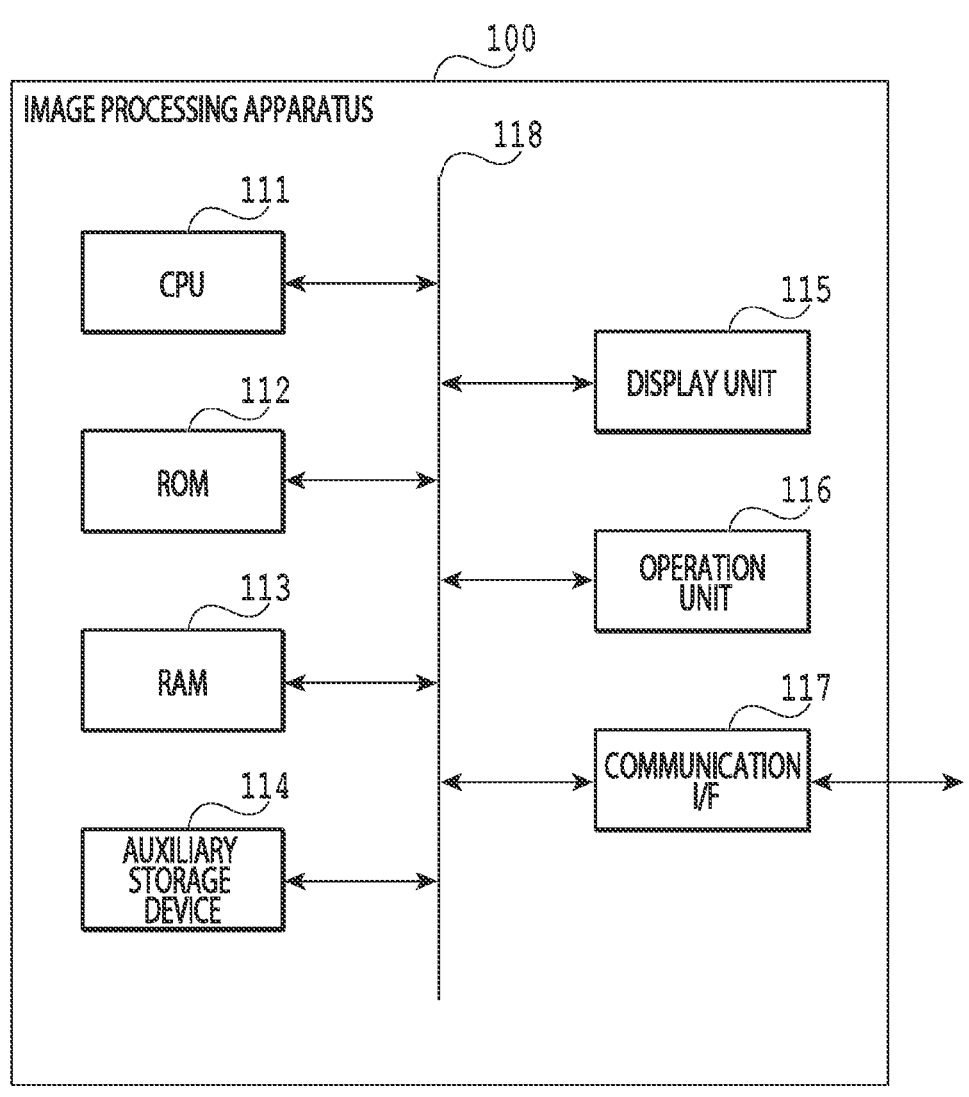
FIG. 1 is a diagram illustrating an example of a hardware configuration of an image processing apparatus.

[Hardware Configuration]
FIG. 1 is a diagram illustrating an example of a hardware configuration of an image processing apparatus 100 that generates a virtual viewpoint image. The virtual viewpoint image is an image expressing a view from a virtual viewpoint that is different from a view from a viewpoint of an actual image capturing apparatus. The virtual viewpoint image is generated by multiple captured images obtained by image capturing performed by the multiple image capturing apparatuses 110 (see FIG. 3) installed at different positions to capture an image of an image capturing region including an object from multiple viewpoints in clock synchronization. Note that, the virtual viewpoint image may be either of a moving image and a still image. In the embodiments below, descriptions are given assuming that the virtual viewpoint image is a moving image.

As illustrated in FIG. 1, the image processing apparatus 100 includes a CPU 111, a ROM 112, a RAM 113, an auxiliary storage device 114, a display unit 115, an operation unit 116, a communication I/F 117, and a bus 118.

The CPU 111 implements functions of the image processing apparatus 100 by controlling overall the image processing apparatus 100 by using a computer program or data stored in the ROM 112 and the RAM 113. Note that, the image processing apparatus 100 may include one or more pieces of dedicated hardware different from the CPU 111, and at least a part of processing by the CPU 111 may be executed by the dedicated hardware. An example of the dedicated hardware may include application specific integrated circuits (ASIC), a field programmable gate array (FPGA), a digital signal processor (DSP), and so on.

The ROM 112 stores a program and the like that do not need to be changed. The RAM 113 temporarily sores a program and data supplied from the auxiliary storage device 114 and data and the like supplied from the outside through the communication I/F 117. The auxiliary storage device 114 is formed of a hard disk drive or the like, for example, and stores various data such as image data and voice data.

The display unit 115 is formed of a liquid crystal display, an LED, or the like, for example, and displays a graphical user interface (GUI) and the like for a user to operate the image processing apparatus 100. The operation unit 116 is formed of a keyboard, a mouse, a joystick, or a touch panel, for example, and inputs various instructions to the CPU 111 in response to an operation by the user. The CPU 111 also operates as a display control unit that controls the display unit 115 and an operation control unit that controls the operation unit 116.

The communication I/F 117 is used for communication between the image processing apparatus 100 and an external apparatus. For example, in a case where the image processing apparatus 100 is connected with the external apparatus with wire, a cable for communication is connected to the communication I/F 117. In a case where the image processing apparatus 100 has a function of wireless communication with the external apparatus, the communication I/F 117 includes an antenna. The bus 118 connects the units in the image processing apparatus 100 and transfers information.

In the present embodiment, the display unit 115 and the operation unit 116 are in the inside of the image processing apparatus 100; however, at least either one of the display unit 115 and the operation unit 116 may be outside the image processing apparatus 100 as a separate device.

[About Image Capturing Apparatus]

Figure 3:
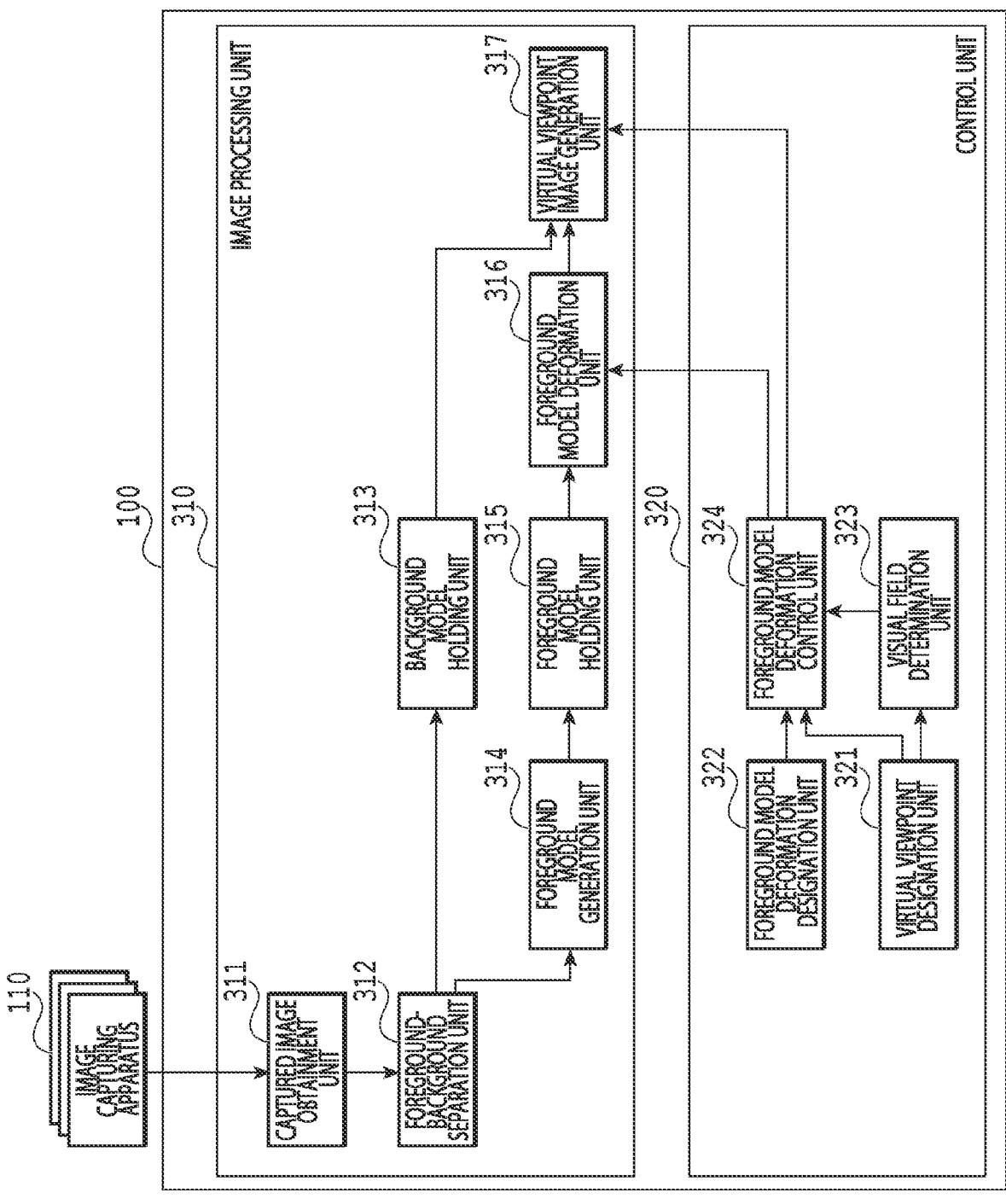
FIG. 3 is a diagram describing a functional configuration of the image processing apparatus.

The image processing apparatus 100 is connected with the multiple image capturing apparatuses 110 (see FIG. 3). The multiple image capturing apparatuses 110 are arranged to capture an image of the image capturing region from multiple positions. For example, the image capturing region is a field of a stadium in which sports such as soccer and baseball are played or a stage of a venue in which a concert and entertainment are held. The multiple image capturing apparatuses 110 are installed at different positions, respectively, to surround such an image capturing region and perform the image capturing in clock synchronization. Note that, the multiple image capturing apparatuses 110 do not need to be installed over the entire circumference of the image capturing region and may be installed in only some directions in the image capturing region depending on a limitation of the installation place and the like. Additionally, the multiple image capturing apparatuses 110 may include another image capturing apparatus having a different function such as a telephoto camera and a wide-angle camera.

Figure 2:
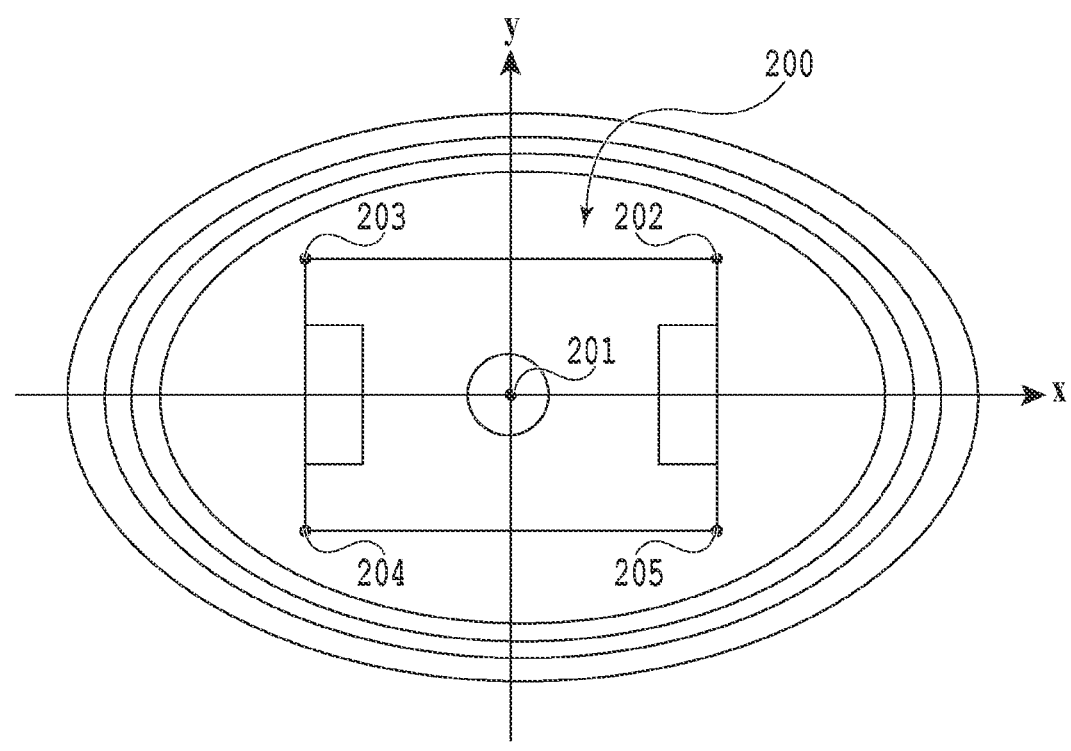
FIG. 2 is a diagram illustrating an example of an image capturing region.

FIG. 2 is a diagram illustrating an example of the image capturing region. As illustrated in FIG. 2, the image capturing region is a field 200 in which a competition is held. A coordinate system is set in the image capturing region. The set coordinate system is used to designate three-dimensional positions of the multiple image capturing apparatuses 110, the virtual viewpoint, and a foreground model. For example, based on an origin that is a central position 201 on the field 200, an x axis is set in a horizontal direction, and a y axis is set in a vertical direction. Additionally, a not-illustrated z axis is set in a height direction.

[Functional Configuration]

FIG. 3 is a diagram describing a functional configuration of the image processing apparatus 100. The image processing apparatus 100 includes an image processing unit 310 and a control unit 320. The image processing unit 310 includes a captured image obtainment unit 311, a foreground-background separation unit 312, a background model holding unit 313, a foreground model generation unit 314, a foreground model holding unit 315, a foreground model deformation unit 316, and a virtual viewpoint image generation unit 317.

The captured image obtainment unit 311 obtains multiple captured images of each time that are obtained by the image capturing by the multiple image capturing apparatuses 110 in clock synchronization.

The foreground-background separation unit 312 separates each captured image obtained by the image capturing by the multiple image capturing apparatuses 110 into a foreground image and a background image. For example, the foreground-background separation unit 312 separates the captured image into the foreground image and the background image by using a background difference method.

The foreground image is an image obtained by extracting a region of an object to be a foreground (a foreground region) from the captured image. The object to be the foreground that is extracted as the foreground region indicates a dynamic object (a moving object) that has movement in a case where the image capturing is performed from the same direction chronologically (the position and the shape of the object may be changed). For example, the object to be the foreground is a person such as a player and a referee in a field in which a competition is held and a ball and the like if the competition is a ball game. Alternatively, the object to be the foreground is a singer, a musician, a performer, a presenter, and the like in a concert and entertainment.

The background image is an image expressing a region different from the object to be the foreground in the captured image (a background region). Specifically, the background image is an image in a state in which the object to be the foreground is removed from the captured image. The background indicates an image capturing target that is still or maintains a state close to being still in a case where the image capturing is performed from the same direction chronologically. For example, such an image capturing target is a stadium in which a competition is held, a venue in which a concert is held, a structure such as a goal used in a ball game, and a field. The background may be any region as long as it is a region at least different from the object to be the foreground. The image capturing target of the multiple image capturing apparatuses 110 may include another object and the like in addition to the object to be the foreground and the background.

The background model holding unit 313 holds a background model that is data representing a three-dimensional shape of a target object to be the background of the virtual viewpoint image such as a stadium and a venue. For example, the background model is generated by measuring a stadium, a venue, or the like to be the background three-dimensionally in advance. The form of the background model is a mesh model, for example. Additionally, the background model holding unit 313 holds texture data for coloring the background model. The texture data for coloring the background model is generated based on the background image obtained by the separating from the captured image by the foreground-background separation unit 312.

The foreground model generation unit 314 generates data representing a three-dimensional shape of the object to be the foreground (three-dimensional shape data) by using the foreground image obtained by the separating from the captured image by the foreground-background separation unit 312. The three-dimensional shape data of the object to be the foreground is referred to as the foreground model. For example, the foreground model generation unit 314 generates the foreground model by using the foreground image based on the visual hull. It is described that the form of the foreground model is the mesh model representing the three-dimensional shape by connecting faces of polygons such as triangles; however, the form of the foreground model is not limited to the mesh model. Additionally, the foreground model generated by the foreground model generation unit 314 is the three-dimensional shape data that is generated such that the ratio of the size with respect to the background is equal to the actual ratio.

The foreground model holding unit 315 holds the foreground model generated by the foreground model generation unit 314. Additionally, the foreground model holding unit 315 holds also the texture data for coloring the foreground model. The texture data for coloring the foreground model is generated based on the foreground image obtained by the separating from the captured image by the foreground-background separation unit 312.

The foreground model deformation unit 316 obtains the foreground model as the processing target from the foreground model holding unit 315 and deforms the foreground model according to an instruction from the control unit 320 to obtain the deformed foreground model. The foreground model subjected to the deformation processing is outputted to the virtual viewpoint image generation unit 317. The deformation of the foreground model includes enlarging and dividing. Details of the deformation processing on the foreground model are described later. The foreground model deformation unit 316 may obtain the foreground model that is deformed by an external apparatus or the like.

The virtual viewpoint image generation unit 317 maps the corresponding texture data to each of the foreground model and the background model, performs rendering according to virtual viewpoint information designated by the control unit 320, and generates the virtual viewpoint image. The generated virtual viewpoint image is displayed on the display unit 115, for example.

The virtual viewpoint information is information at least including a position of the virtual viewpoint, a line of sight direction from the virtual viewpoint, and a focal length. Assuming that the virtual viewpoint is replaced with a virtual camera, the position of the virtual viewpoint corresponds to the position of the virtual camera, and the line of sight direction from the virtual viewpoint corresponds to the direction the virtual camera is facing, respectively. Additionally, the virtual viewpoint image corresponds to a captured image obtained by the virtual image capturing by the virtual camera.

The virtual viewpoint information is information on a parameter set including a parameter representing the three-dimensional position of the virtual viewpoint, a parameter representing pan, tilt, and roll directions representing the line of sight direction from the virtual viewpoint, and a parameter representing the focal length. Additionally, the virtual viewpoint information may include multiple parameter sets. For example, the virtual viewpoint information may include the multiple parameter sets corresponding to multiple frames forming a movie of the virtual viewpoint image, respectively, and may be information indicating the position of the virtual viewpoint and the line of sight direction from the virtual viewpoint at each of multiple sequential time points.

As illustrated in FIG. 3, the control unit 320 of the image processing apparatus 100 includes a virtual viewpoint designation unit 321, a foreground model deformation designation unit 322, a visual field determination unit 323, and a foreground model deformation control unit 324.

The virtual viewpoint designation unit 321 generates the virtual viewpoint information for generating the virtual viewpoint image. The user designates the position, the line of sight direction, and the focal length of the virtual viewpoint by using the operation unit 116, and the virtual viewpoint designation unit 321 generates the virtual viewpoint information that includes the position, the line of sight direction, and the focal length of the virtual viewpoint that are designated by the user.

Figure 4:
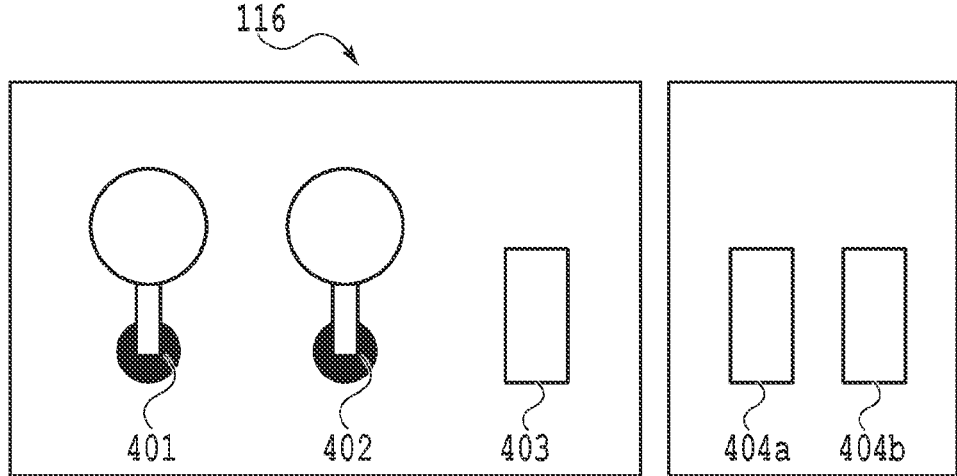
FIG. 4 is a diagram illustrating an example of an operation unit.

FIG. 4 is a diagram illustrating an example of the operation unit 116. Joysticks 401 and 402 are formed so as to allow for operations in three axes (vertical, horizontal, twisting) by the user. The three-dimensional position (x, y, z) of the virtual viewpoint is designated by operating the corresponding axes (vertical, horizontal, twisting) of the joystick 401. Additionally, the line of sight direction (pan, tilt, roll) of the virtual viewpoint is designated by operating the corresponding axes (vertical, horizontal, twisting) of the joystick 402. A seesaw switch 403 is used to designate the focal length of the virtual viewpoint.

The foreground model deformation designation unit 322 generates deformation information, which is information used in the deformation of the foreground model by the foreground model deformation unit 316. The deformation information includes a value of each of an enlargement ratio and a division rate. The user designates the values of the enlargement ratio and the division rate by using the operation unit 116, and the foreground model deformation designation unit 322 generates the deformation information that includes the values of the enlargement ratio and the division rate designated by the user. The virtual viewpoint information and the deformation information are outputted to the image processing unit 310 as the parameter set.

FIG. 5 is a diagram illustrating an example of a format of the parameter set including the virtual viewpoint information and the deformation information that is generated by the control unit 320 and transmitted to the image processing unit 310. For example, the parameter set is formed of a combination of a key (an item) that can be nested and a value corresponding to the key.

In FIG. 5, viewpoint is a key corresponding to the virtual viewpoint information. In viewpoint, keys that are position, rotation, and zoom are included, and values corresponding to the keys, respectively, are held: position is a key corresponding to the three-dimensional position of the virtual viewpoint; rotation is a key corresponding to the line of sight direction from the virtual viewpoint; and zoom is a key corresponding to the focal length. It can be seen from FIG. 5 that −40.0, 0.0, 2.0 is held as the value of the three-dimensional position of the virtual viewpoint, 180.0, 0.0, 0.0 is held as the value of the line of sight direction, and 24 is held as the value of the focal length.

On the other hand, foreground is a key corresponding to the deformation information. In foreground, keys that are scale and proportion are included, and values corresponding to the keys, respectively, are held: scale is a key corresponding to the enlargement ratio; and proportion is a key corresponding to the division rate.

The visual field determination unit 323 determines whether a visual field (an angle of view) represented by the virtual viewpoint information generated by the virtual viewpoint designation unit 321 is a panoramic visual field or a normal visual field. The visual field represented by the virtual viewpoint information indicates a range included in the virtual viewpoint image generated by the virtual viewpoint information. Assuming that the virtual viewpoint is the virtual camera, it can be said that the visual field represented by the virtual viewpoint information is an image capturing range of the virtual camera.

The panoramic visual field is a visual field including the entirety of the image capturing regions of the multiple image capturing apparatuses 110. In a case where the image capturing region is the field 200 as illustrated in FIG. 2 in which a competition is held, the panoramic visual field is a visual field including the entirety of the field 200 and is a visual field that allows the viewer to figure out the positions of the players and the formation of the players on the field 200. Additionally, a visual field narrower than the panoramic visual field, in other words, a visual field other than the panoramic visual field is referred to as the normal visual field.

The foreground model deformation control unit 324 performs control whether to deform the foreground model depending on the visual field represented by the virtual viewpoint information. Specifically, in a case where the visual field represented by the virtual viewpoint information is the panoramic visual field, the foreground model deformation control unit 324 performs control to allow for the deformation of the foreground model.

For example, in a case where the visual field is the panoramic visual field, the foreground model deformation control unit 324 configures setting to validate the deformation of the foreground model, and in a case where the visual field is the normal visual field, the foreground model deformation control unit 324 configures setting to invalidate the deformation of the foreground model. In a case of the setting to validate the deformation of the foreground model, the deformation information including the values of the enlargement ratio and the division rate designated by the user is outputted to the foreground model deformation unit 316. Then, control is performed such that the foreground model deformation unit 316 deforms the foreground model at the enlargement ratio and the division rate designated by the user.

On the other hand, in a case of the setting to invalidate the deformation of the foreground model, the values of the enlargement ratio and the division rate are corrected to 1 even in a case where the user designates the enlargement ratio and the division rate, and the deformation information that includes the values of the enlargement ratio and the division rate after the correction is transmitted to the foreground model deformation unit 316. As described later, a case where the value of the enlargement ratio is 1, and the value of the division rate is 1 means that the foreground model is not deformed. Therefore, in a case of the setting to invalidate the deformation of the foreground model, control is performed such that the foreground model deformation unit 316 does not deform the foreground model.

Note that, in a case where the virtual viewpoint information includes the multiple parameter sets, there may be included a parameter to invalidate the transition of the visual field from the panoramic visual field to the normal visual field in a case where the foreground model is deformed.

Each functional unit in the image processing apparatus 100 in FIG. 3 is implemented with the CPU 111 executing a predetermined program; however, it is not limited thereto. In addition, for example, hardware such as a graphics processing unit (GPU) to speed up the computation or a field programmable gate array (FPGA) may be used. Each functional unit may be implemented by cooperation of software and hardware such as a dedicated IC, or a part of or all the functions may be implemented by only hardware.

[About Deformation of Foreground Model (Enlarging and Dividing)]

Figure 6:
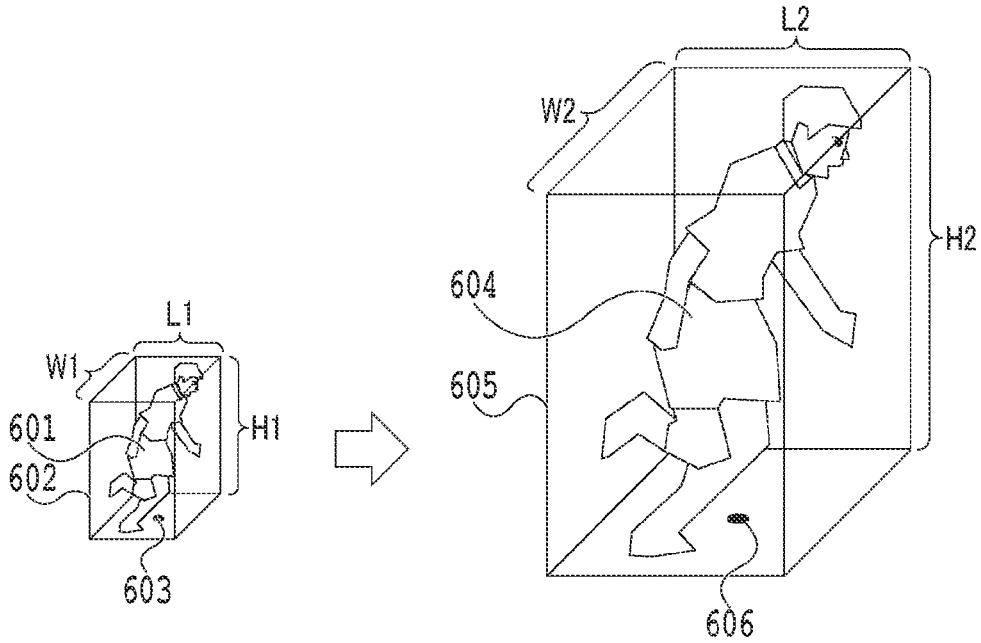
FIG. 6 is a diagram describing a method of enlarging a foreground model.

FIG. 6 is a diagram describing a method of enlargement processing that is one of deformation processing on the foreground model performed by the foreground model deformation unit 316. In FIG. 6, a foreground model 601 is the foreground model before being enlarged that is generated by the foreground model generation unit 314. A foreground model 604 is the foreground model after being enlarged that is obtained with the foreground model deformation unit 316 performing the deformation processing on the foreground model 601.

The foreground model deformation unit 316 performs the processing to enlarge the foreground model 601. In a case of enlarging the foreground model, the foreground model deformation unit 316 obtains the value of the enlargement ratio of the foreground model from the foreground model deformation designation unit 322. The value of the enlargement ratio is expressed as scale. A value that can be obtained as the value of the enlargement ratio is scale≥1. In a case where scale=1 is obtained as the value of the enlargement ratio, it means that the foreground model is not enlarged.

The foreground model deformation unit 316 derives a bounding box 602 that is a cuboid circumscribed to the foreground model 601 as the enlargement target. A center 603 of a bottom face of the derived bounding box 602 is a reference point in a case of enlarging the foreground model 601.

The foreground model deformation unit 316 fixes the position of the reference point and enlarges the foreground model 601 according to the enlargement ratio. Specifically, the foreground model deformation unit 316 generates the enlarged foreground model 604 by converting a three-dimensional coordinate of each vertex forming the mesh expressing the foreground model 601 by using Expression (1) below:

$$v2 = (v1 - vb) \times scale + vb. \qquad \text{Expression (1)}$$

Here, v1 is a coordinate of the vertex forming the mesh before the enlargement, v2 is a coordinate of the corresponding vertex after the enlargement, and vb is a coordinate of the reference point.

The following relationship is established between the foreground model 601 before the enlargement and the foreground model 604 after the enlargement. The values of the width, the depth, and the height of the bounding box 602 surrounding the foreground model 601 before the enlargement are L1, W1, and H1, respectively. The values of the width, the depth, and the height of a bounding box 605 surrounding the foreground model 604 after the enlargement are L2, W2, and H2, respectively. In this case, a relationship of L2/L1=W2/W1=H2/H1=scale is established. Values of the three-dimensional coordinates of the center 603 of the bottom face of the bounding box 602 before the enlargement and a center 606 of the bottom face of the bounding box after the enlargement are equal to each other.

Figure 7:
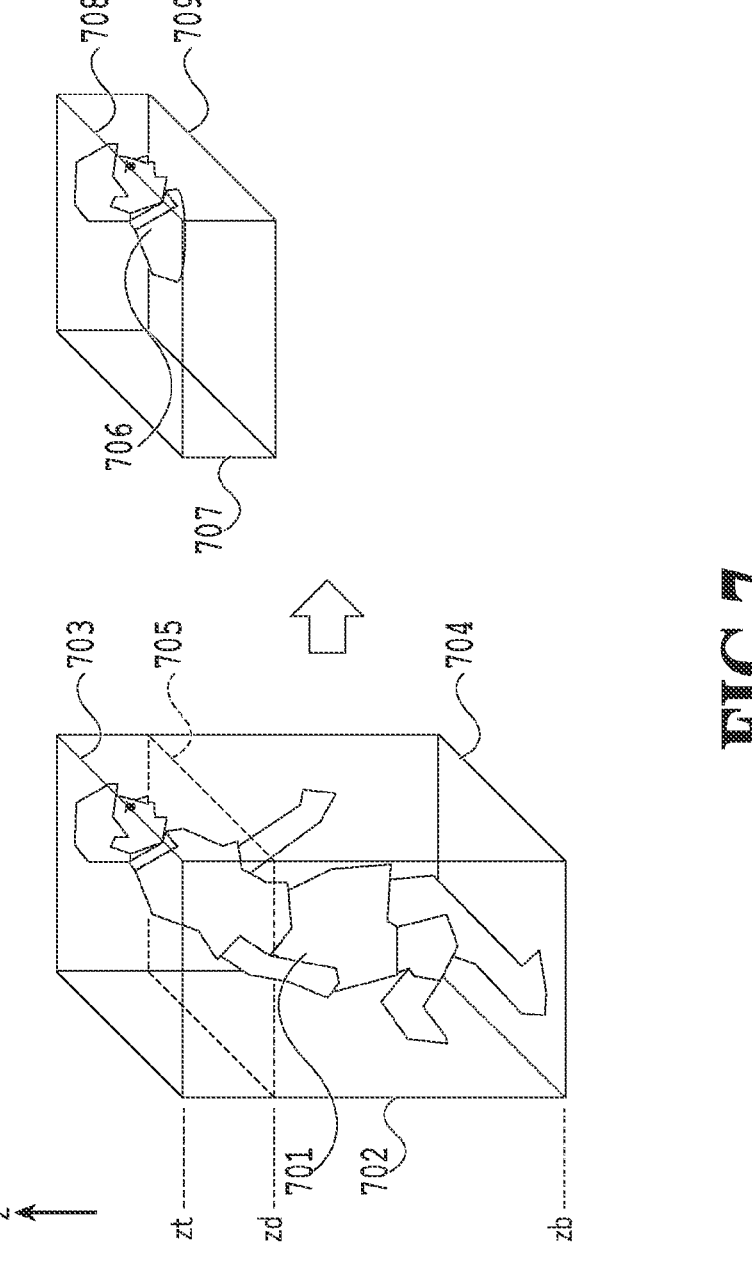
FIG. 7 is a diagram describing a method of dividing the foreground model.

FIG. 7 is a diagram describing a division method that is one of the deformation processing on the foreground model performed by the foreground model deformation unit 316. In FIG. 7, a foreground model 701 is the foreground model before being divided, and a foreground model 706 is the foreground model after being divided.

In a case where the foreground model is divided, the foreground model deformation unit 316 obtains the value of the division rate of the foreground model from the foreground model deformation designation unit 322. The value of the division rate is expressed as proportion. A range in which the value of the division rate can be obtained is 0<proportion≤1. In a case where proportion=1 is obtained as the value of the division rate, it means that the foreground model is not divided.

The foreground model deformation unit 316 derives a bounding box 702 circumscribed to the foreground model 701 as the division target. A value zd of a z coordinate at the position of a division face 705 corresponding to the division rate in the derived bounding box 702 is derived.

As illustrated in FIG. 7, a value of the z coordinate at the position of a top face 703 of the bounding box 702 is zt, and a value of the z coordinate at the position of a bottom face 704 is zb. The division rate indicates a rate in the z direction of a part of the foreground model before the division that remains as a result of the division. Accordingly, the division rate is expressed by Expression (2) below:

$$\text{proportion} = (zt - zd)/(zt - zb). \qquad \text{Expression (2)}$$

Therefore, the value zd of the z coordinate representing the position of the division face 705 in the z direction is derived from Expression (3) below:

$$v2 = v1 - vd \qquad \text{Expression (4)}$$

(note that, in a case where the z coordinate of v1 is smaller than zd, deletion is performed).

The foreground model deformation unit 316 performs the processing to divide the foreground model 701 at the derived division face 705. Specifically, the foreground model deformation unit 316 converts the three-dimensional coordinate of each vertex of the face forming the mesh of the foreground model 701 by using Expression (4) below:

$$zd - zt \times (1 - \text{proportion}) + zb \times \text{proportion}. \qquad \text{Expression (3)}$$

Here, v1 is a coordinate of the position of the vertex of the face forming the mesh before the division, v2 is a coordinate of the position of the corresponding vertex after the division, and vd is a coordinate for supporting the calculation, which is ((0, 0, zd−zb)=vd. The meaning in the brackets in Expression (4) is that a face out of the faces forming the mesh of the foreground model 701 that has a vertex with a smaller value of the z coordinate than zd is deleted.

The following relationship is established between the foreground model 701 before the division and the foreground model 706 after the division. The bottom face 704 of the bounding box 702 surrounding the foreground model 701 before the division and a bottom face 709 of a bounding box 707 surrounding the foreground model 706 after the division are at the same position.

For example, as the value of the enlargement ratio and the value of the division rate, a value designated with the user operating the operation unit 116 is used. A method of designating the enlargement ratio and the division rate by using the operation unit 116 in FIG. 4 is described. A seesaw switch 404a in FIG. 4 is a seesaw switch to designate the enlargement ratio of the foreground model. A seesaw switch 404b is a seesaw switch to designate the division rate of the foreground model. The seesaw switches 404a and 404b are controlled such that the values of the enlargement ratio and the division rate displayed on a screen are increased once upper sides of the seesaw switches 404a and 404b are pressed, and the values are decreased once lower sides thereof are pressed. In a case where a determination button on the screen is pressed once desired values of the enlargement ratio and the division rate are obtained by operating the seesaw switches 404a and 404b, the values of the enlargement ratio and the division rate displayed on the screen are obtained by the foreground model deformation designation unit 322.

Note that, a button instead of the seesaw switch 404a may be provided to the operation unit 116, and the enlargement ratio may be designated by using the button. For example, a button to designate a value (for example, 7.0) determined in advance as the enlargement ratio once being pressed by the user may be provided. Additionally, a button instead of the seesaw switch 404b may be provided, and the division rate may be designated by using the button. For example, a value (for example, 0.25) determined in advance may be designated as the division rate once the user presses the button.

It can be said that the operation unit 116 includes two types of zoom switches. The first zoom switch is the seesaw switch 403, and the focal length of the virtual viewpoint, that is, the entire enlargement ratio including the foreground and the background is designated by operating the seesaw switch 403. The second zoom switch is the seesaw switch 404a, and the enlargement ratio of the foreground model is designated by operating the seesaw switch 404a. Note that, in a case where the seesaw switch 404a is operated, only the foreground model is enlarged, and the background model remains without enlargement.

[About Method of Determining Visual Field]

An example of a method of determining by the visual field determination unit 323 whether the visual field represented by the virtual viewpoint information is the panoramic visual field is described. In order to determine whether the visual field represented by the virtual viewpoint information is the panoramic visual field, a position in the image capturing region that is included in a case where the visual field is the panoramic visual field is designated in advance. In a case where the image capturing region is the field 200 as illustrated in FIG. 2, it is desirable to designate multiple positions surrounding the field 200 as the designated position. For example, positions of four corners of the field (positions 202 to 205 in FIG. 2) are designated.

Then, whether each of the designated positions is included in the visual field represented by the virtual viewpoint information is determined. Then, in a case where all the designated positions 202 to 205 are included in the visual field represented by the virtual viewpoint information, the visual field determination unit 323 determines that the visual field is the panoramic visual field. On the other hand, in a case where at least one of the designated positions 202 to 205 is not included in the visual field represented by the virtual viewpoint information, the visual field determination unit 323 determines that the visual field is the normal visual field.

For example, the determination of whether the designated positions 202 to 205 are included in the visual field represented by the virtual viewpoint information is performed as follows. A predetermined position is designated in advance in the image capturing region. For example, a central position in the field (the position 201 in FIG. 2) is designated as the predetermined position. Then, a resolution in the virtual viewpoint image at the designated predetermined position 201 is obtained by using Expression (5) below based on the virtual viewpoint information. The resolution is the image capturing range of each pixel expressed in a unit of mm/pixel:

$$\text{resolution} = L \times \delta/f. \qquad \text{Expression (5)}$$

Here, L (mm) is a distance from the virtual viewpoint to the predetermined position 201 and is obtained from the coordinate of each of the position of the virtual viewpoint and the predetermined position 201, f (mm) is the focal length indicated by the virtual viewpoint information, and δ (mm/pixel) is a pixel size of a sensor in a case of assuming that the virtual viewpoint is the virtual camera. Note that, δ is designated in advance. A greater resolution value means a wider visual field. Accordingly, if the obtained resolution is greater than a predetermined value, the visual field determination unit 323 can determine that the visual field is the panoramic visual field, and if the resolution is smaller than the predetermined value, the visual field determination unit 323 can determine that the visual field is the normal visual field.

For example, the predetermined value compared with the resolution to determine whether the visual field is the panoramic visual field is obtained by the following method. Assuming that the size of the field 200 is 100 m×70 m, and the size of the generated virtual viewpoint image is 1980 pixel×1080 pixel. In order to include the entirety of the field 200 in the horizontal direction in the virtual viewpoint image, a resolution of 100 m/1980≈50 mm/pixel is required; for this reason, 50 mm/pixel is set as the predetermined value. Alternatively, in order to include the entirety of the field in the vertical direction is included in the virtual viewpoint image, 70 m/1080 pixel≈65 mm/pixel that is obtained by using a length of the field in the vertical direction and a pixel in the vertical direction may be set as the predetermined value.

In addition, whether the visual field is the panoramic visual field may be determined based on a substantial size of the virtual viewpoint image of a predetermined section on the screen. This is because, for example, if there is the virtual viewpoint at a zoomed-out position at which the entirety of the competition field can be shown, the virtual viewpoint image can be presumed to be comparable to a panoramic image (the visual field is the panoramic visual field) even if the entire field is not shown in the virtual viewpoint image. In this case, for example, first, a camera matrix obtained from the virtual viewpoint information is used to convert the three-dimensional coordinate (x, y, z) of each of the designated positions 202 to 205 into a two-dimensional coordinate (u, v) corresponding to the virtual viewpoint image. Then, in a case where the converted two-dimensional coordinate (u, v) is within a range of the size of the virtual viewpoint image, it is determined that the designated positions 202 to 205 are included in the visual field represented by the virtual viewpoint information. For example, in a case where the size of the virtual viewpoint image is 1980 pixel×1080 pixel, and the values after the conversion are 0≤u<1980 and 0≤v<1080, it is possible to determine that the designated positions 202 to 205 are included in the visual field represented by the virtual viewpoint information. Alternatively, an area of a rectangle is obtained from the converted four two-dimensional coordinates, and if it is determined that the area is smaller than 1980×1080 (=2,138,400), it is possible to determine that the designated positions 202 to 205 are included in the visual field represented by the virtual viewpoint information.
[Flowchart]

Figure 8:
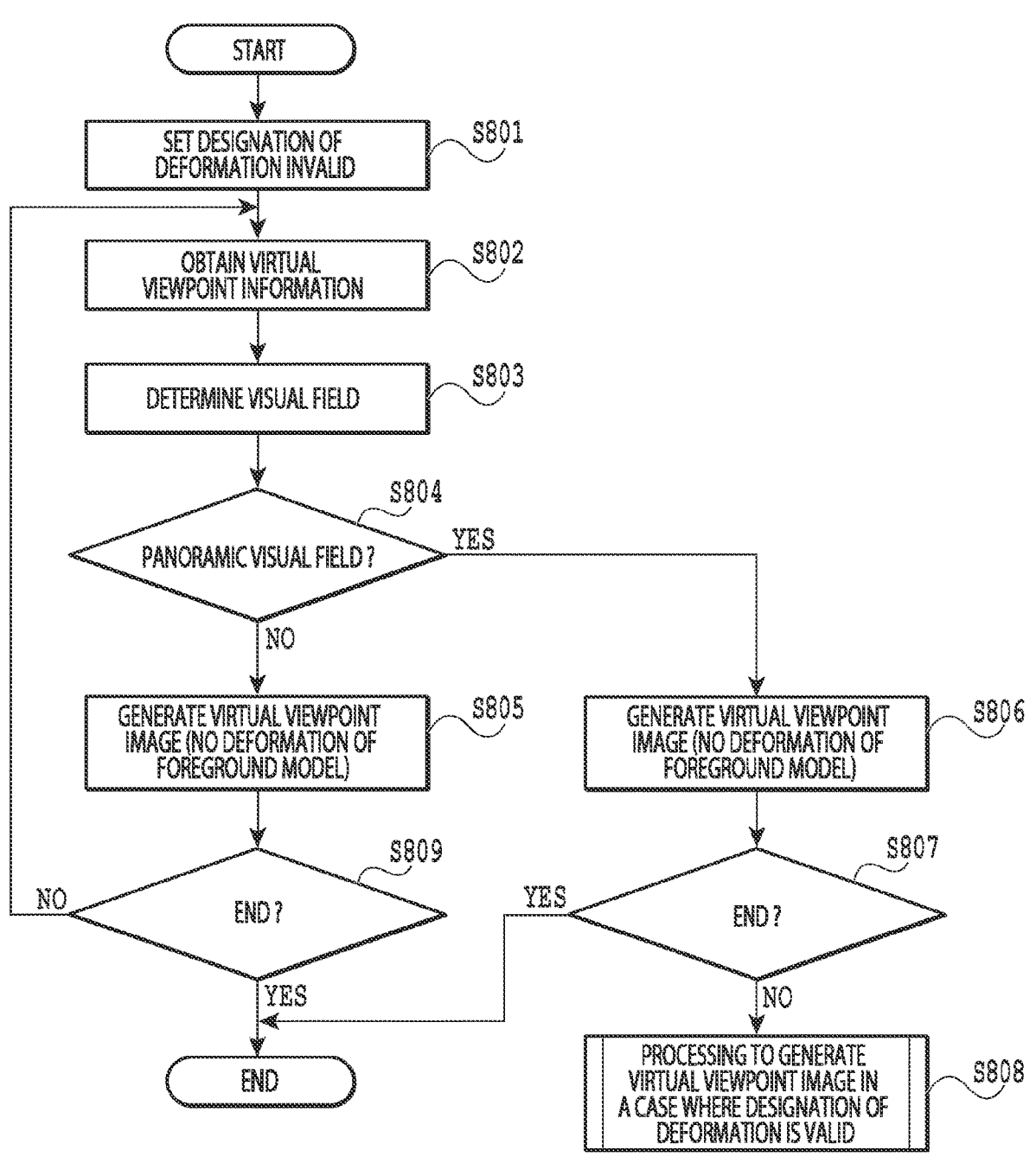
FIG. 8 is a flowchart describing processing to generate a virtual viewpoint image.
Figure 9:
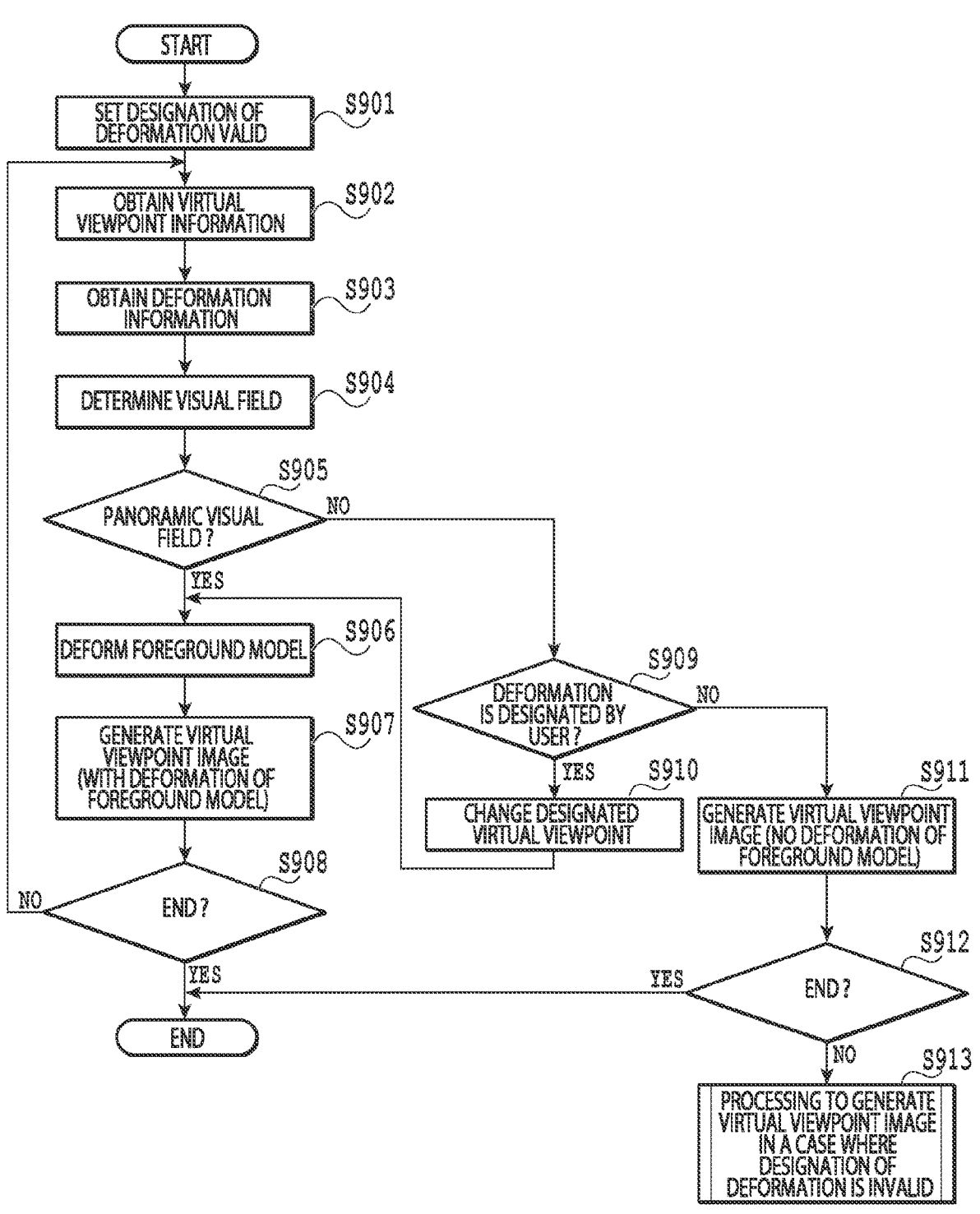
FIG. 9 is a flowchart describing processing to generate the virtual viewpoint image.

FIGS. 8 and 9 are flowcharts describing processing to generate the virtual viewpoint image of each frame by the image processing apparatus 100 of the present embodiment. A series of processing illustrated in the flowcharts in FIGS. 8 and 9 is performed with the CPU of the image processing apparatus 100 deploying a program code stored in the ROM to RAM to execute. Additionally, a part of or all the functions of steps in FIGS. 8 and 9 may be implemented by hardware such as an ASIC and an electronic circuit. Note that, a sign "S" in each description of the processing means that it is a step in the flowchart, and the same applies to the subsequent flowchart.

FIG. 8 is a flowchart describing the processing to generate the virtual viewpoint image of each frame as the processing target in a case where the setting to invalidate the deformation of the foreground model is configured.

In S801, the foreground model deformation control unit 324 configures the setting to invalidate the deformation of the foreground model. Once the setting to invalidate the deformation of the foreground model is configured, it is controlled that the designation to deform the foreground model is not accepted even if the user makes the designation through the operation unit 116. In other words, even if the user designates the enlargement ratio to a value greater than 1, the designation by the user is not reflected in the foreground model.

In S802, the virtual viewpoint designation unit 321 obtains the virtual viewpoint information on the frame as the processing target. The virtual viewpoint information on the frame as the processing target is information generated based on the position of the virtual viewpoint, the line of sight direction from the virtual viewpoint, the focal length, and the like of the frame as the processing target that are designated by the user through the operation unit 116.

In S803, the visual field determination unit 323 determines the visual field represented by the virtual viewpoint information on the frame as the processing target that is obtained in S802.

In S804, the control unit 320 determines whether the visual field determined in S803 is the panoramic visual field, and the processing diverges depending on the determination result. If it is determined that the visual field represented by the virtual viewpoint information on the frame as the processing target is the panoramic visual field (YES in S804), the control unit 320 allows the processing to proceed to S806. If it is determined that the visual field represented by the virtual viewpoint information on the frame as the processing target is the normal visual field (NO in S804), the control unit 320 allows the processing to proceed to S805.

Since the setting to invalidate the deformation of the foreground model is configured in S801, in S805 and S806, processing to generate the virtual viewpoint image corresponding to the frame as the processing target is performed by using the foreground model that is not deformed. The generation of the virtual viewpoint image performed in S805 and S806 is performed as follows.

The foreground model deformation control unit 324 outputs the deformation information in which the value of the enlargement ratio is 1 and the value of the division rate is 1 to the foreground model deformation unit 316. Additionally, the foreground model deformation control unit 324 outputs the virtual viewpoint information on the frame as the processing target to the virtual viewpoint image generation unit 317.

The foreground model deformation unit 316 obtains the foreground model generated based on the captured image corresponding to the frame as the processing target from the foreground model holding unit 315. In other words, the foreground model on which the deformation processing is not performed, which corresponds to the frame as the processing target, is obtained. Additionally, the foreground model deformation unit 316 obtains the deformation information outputted from the foreground model deformation control unit 324. The obtained deformation information includes that the value of the enlargement ratio is 1 and the value of the division rate is 1. Accordingly, based on the deformation information, it is determined that the foreground model is not deformed. Therefore, the foreground model deformation unit 316 outputs the obtained foreground model to the virtual viewpoint image generation unit 317 without deformation.

The virtual viewpoint image generation unit 317 obtains the background model from the background model holding unit 313 and obtains the foreground model of the processing target frame that is not deformed from the foreground model deformation unit 316. The virtual viewpoint image generation unit 317 then renders the obtained background model and foreground model based on the virtual viewpoint information on the frame as the processing target and generates the virtual viewpoint image of the frame as the processing target. Once the generation of the virtual viewpoint image of the frame as the processing target ends in S805, the processing proceeds to S809. Once the generation of the virtual viewpoint image of the frame as the processing target ends in S806, the processing proceeds to S807.

In S807 and S809, the control unit 320 determines whether an instruction to end the generation of the virtual viewpoint image is received from the user. For example, if the user gives the ending instruction by using the operation unit 116, the instruction is received by the control unit 320. If it is determined in S807 or S809 that the control unit 320 receives the ending instruction from the user (YES in S807, YES in S809), the processing of the present flowchart ends.

If it is determined in S809 that the control unit 320 does not receive the ending instruction from the user (NO in S809), the processing returns to S802 to generate the virtual viewpoint image of the next frame. In other words, since the transition to S809 means that it is determined in S804 that the visual field is the normal visual field, the processing to generate the virtual viewpoint image of the next frame is performed while keeping the setting to invalidate the deformation of the foreground model. In a case where the virtual viewpoint image of the moving image is generated in this way, for example, the processing in FIG. 8 or FIG. 9 is repeated at 60 frame/second to generate the virtual viewpoint image of the moving image formed of multiple frames.

On the other hand, if it is determined in S807 that the control unit 320 does not receive the ending instruction from the user (NO in S807), the processing proceeds to S808. In other words, the transition to S807 means that it is determined in S804 that the visual field is the panoramic visual field, and since the virtual viewpoint image of the next frame is generated with the setting to validate the deformation of the foreground model in a case where the visual field is the panoramic visual field in the present embodiment, the processing proceeds to S808.

FIG. 9 is a flowchart describing processing to generate the virtual viewpoint image of each frame as the processing target in a case where the setting to validate the deformation of the foreground model is configured. Details of the processing in S808 are described with reference to FIG. 9.

In S901, the foreground model deformation control unit 324 configures the setting to validate the deformation of the foreground model.

S902 is a similar step as S802, and the virtual viewpoint designation unit 321 obtains the virtual viewpoint information on the frame as the processing target.

In S903, the foreground model deformation designation unit 322 obtains the deformation information on the frame as the processing target that includes the value of the enlargement ratio and the value of the division rate designated with the user operating the operation unit 116.

S904 is a similar step as S803, and the visual field determination unit 323 determines the visual field represented by the virtual viewpoint information on the frame as the processing target that is obtained in S902.

In S905, the control unit 320 determines whether the visual field determined in S904 is the panoramic visual field, and the processing diverges depending on the determination result. If it is determined that the visual field represented by the virtual viewpoint information on the frame as the processing target is the panoramic visual field (YES in S905), the control unit 320 allows the processing to proceed to S906.

In S906, the processing to deform the foreground model corresponding to the frame as the processing target is performed. First, in S906, the foreground model deformation control unit 324 outputs the deformation information obtained in S903 to the foreground model deformation unit 316. The foreground model deformation unit 316 obtains the foreground model of the frame as the processing target from the foreground model holding unit 315 and deforms the obtained foreground model to enlarge or to enlarge and divide in accordance with the value of the enlargement ratio and the value of the division rate included in the deformation information. The deformed foreground model is outputted to the virtual viewpoint image generation unit 317. The processing then proceeds to S907.

In S907, the processing to generate the virtual viewpoint image corresponding to the frame as the processing target by using the deformed foreground model is performed. First, in S907, the foreground model deformation control unit 324 outputs the virtual viewpoint information on the frame as the processing target to the virtual viewpoint image generation unit 317. The virtual viewpoint image generation unit 317 obtains the background model from the background model holding unit 313 and obtains the deformed foreground model from the foreground model deformation unit 316. The virtual viewpoint image generation unit 317 then renders the background model and the deformed foreground model based on the virtual viewpoint information on the frame as the processing target and generates the virtual viewpoint image of the frame as the processing target. Once the virtual viewpoint image of the frame as the processing target is generated in S907, the processing proceeds to S908.

On the other hand, if it is determined in S905 that the visual field represented by the virtual viewpoint information on the frame as the processing target is the normal visual field (NO in S905), the control unit 320 allows the processing to proceed to S909.

In S909, the control unit 320 allows the processing to diverge depending on whether the user designates the deformation of the foreground model. If at least one of the value of the enlargement ratio and the value of the division rate included in the deformation information obtained in S903 is other than 1, the control unit 320 determines that the user designates the deformation. If it is determined in S909 that the user designates the deformation of the foreground model (YES in S909), the control unit 320 allows the processing to proceed to S910.

In S910, the foreground model deformation control unit 324 performs the processing to invalidate the virtual viewpoint information obtained in S902. Specifically, the virtual viewpoint information on the processing frame is replaced with the value of the virtual viewpoint information included in the parameter set of the frame just before the current frame. The visual field represented by the virtual viewpoint information on the frame just before the current frame is the visual field determined as the panoramic visual field. Therefore, with the processing in S910, the virtual viewpoint information on the processing target frame is replaced with the virtual viewpoint information representing the panoramic visual field. Then, the processing proceeds to S906 described above, and in S906 to S907, the virtual viewpoint image of the panoramic visual field is generated by using the foreground model deformed at the enlargement ratio and the division rate designated by the user.

As described above, in the present embodiment, in a case where the setting to validate the deformation of the foreground model is configured, it is controlled such that the transition from the panoramic visual field to the normal visual field is not performed within a period of time in which the user designates the deformation of the foreground model.

On the other hand, if it is determined in S909 that the user does not designate the deformation of the foreground model (NO in S909), the control unit 320 allows the processing to proceed to S911.

S911 is a step similar to S805, and the virtual viewpoint image of the normal visual field is generated by using the foreground model that is not deformed with the procedure described in S805. Once the virtual viewpoint image of the frame as the processing target is generated in S911, the processing proceeds to S912.

In S908 and S912, the control unit 320 determines whether the instruction to end the generation of the virtual viewpoint image is received from the user. If the control unit 320 determines in S908 or S912 that the ending instruction is received from the user (YES in S908, YES in S912), the processing in the present flowchart ends.

If the control unit 320 determines in S908 that the ending instruction is not received from the user (NO in S908), the processing returns to S902 to generate the virtual viewpoint image of the next frame. In other words, since it is determined in S905 that the visual field is the panoramic visual field, the processing to generate the virtual viewpoint image of the next frame is performed while keeping the setting to validate the deformation of the foreground model.

On the other hand, if the control unit 320 determines in S912 that the ending instruction is not received from the user (NO in S912), the processing proceeds to S913 to generate the virtual viewpoint image of the next frame with the setting to invalidate the deformation of the foreground model. In S913, the processing in the flowchart in FIG. 8 is performed.

Note that, in a case where the virtual viewpoint image is generated by using the enlarged foreground model, an overlap of the foreground models occurs in some cases. To deal with this, the virtual viewpoint image generation unit 317 may detect whether there is the overlap of the foreground models in a case of rendering the foreground model, and if the overlap is detected, an alert may be displayed on the display unit 115 or the like.

Additionally, in a case where the overlap of the foreground models is detected in a case of rendering the foreground model, the virtual viewpoint image generation unit 317 may adjust the positions of the foreground models to solve the overlap. For example, in a case where the overlap of the foreground models is detected, the virtual viewpoint image generation unit 317 may perform the rendering after adjusting the overlapped foreground models by displacing by a distance designated in advance (for example, one meter in a positive direction of the x axis).

Moreover, in a case where the overlap of the foreground models is detected in a case of rendering the foreground model, the virtual viewpoint image generation unit 317 may perform processing to display a list of the foreground models that are detected as the overlapped models on the display unit 115 such that the user can select the foreground model. Then, once the user selects the foreground model from the list through the operation unit 116, the virtual viewpoint image generation unit 317 may perform the rendering to bring the selected foreground model on the frontmost side.

[Generated Virtual Viewpoint Image]

FIG. 10 is a diagram describing an example of the virtual viewpoint image generated by the image processing apparatus 100. FIG. 10A is an example of the virtual viewpoint image of the normal visual field that is the virtual viewpoint image generated by using the foreground model that is not deformed. FIG. 10B is a diagram illustrating a comparative example of the virtual viewpoint image of the panoramic visual field and is an example of the virtual viewpoint image that is viewed from the virtual viewpoint representing the panoramic visual field and that is generated by using the foreground model that is not deformed. As described above, in the panoramic virtual viewpoint image, the object to be the foreground is displayed small in a case where the deformation to enlarge the foreground model is not performed. For this reason, there may be obtained an image in which the viewer cannot identify the player and cannot check the line of sight of the player and the facial expression of the player.

Figure 10A:
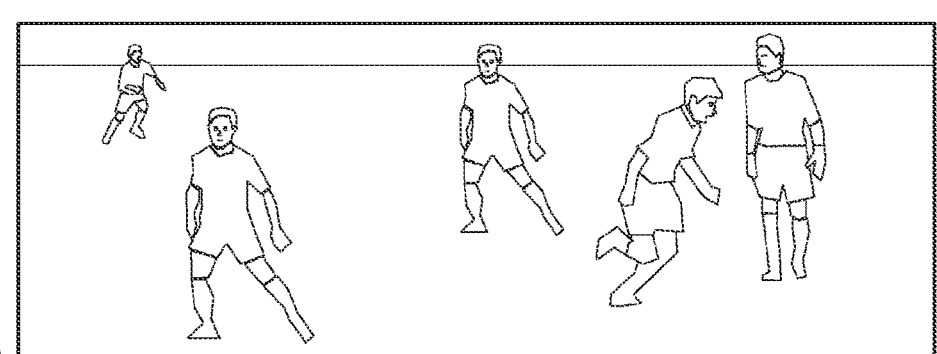
FIGS. 10A to 10D are diagrams describing an example of the virtual viewpoint image generated by the image processing apparatus.
Figure 10B:
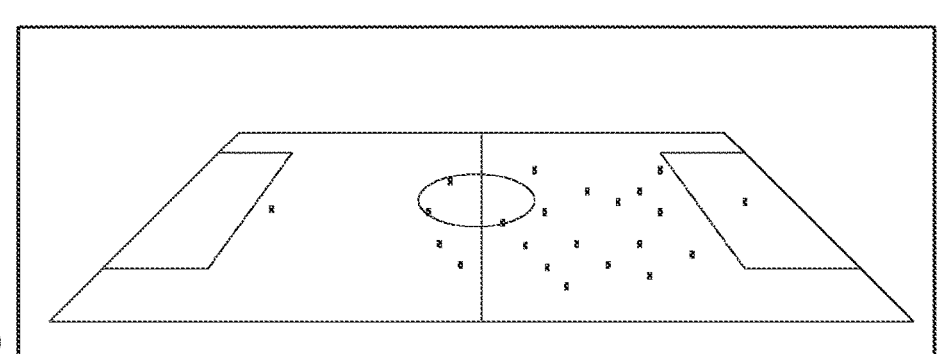
Figure 10C:
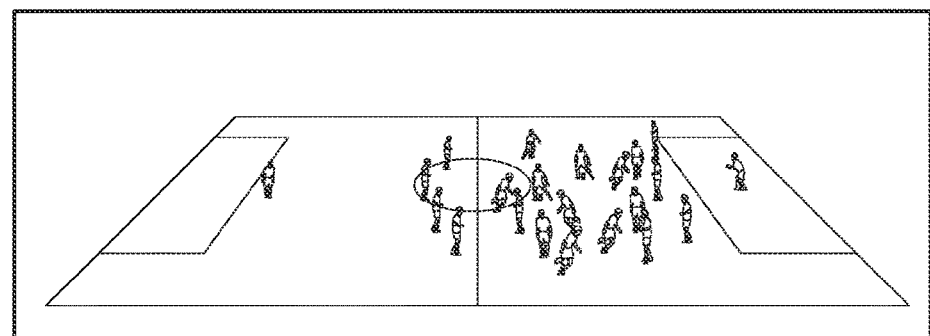

FIG. 10C is a diagram of the panoramic virtual viewpoint image generated by using the foreground model enlarged at an enlargement ratio of sevenfold. In the virtual viewpoint image in FIG. 10C, the player as the object to be the foreground is displayed greater than that in FIG. 10B. Therefore, the viewer can identify the player and can check the line of sight of the player and the facial expression of the player.

Figure 10D:
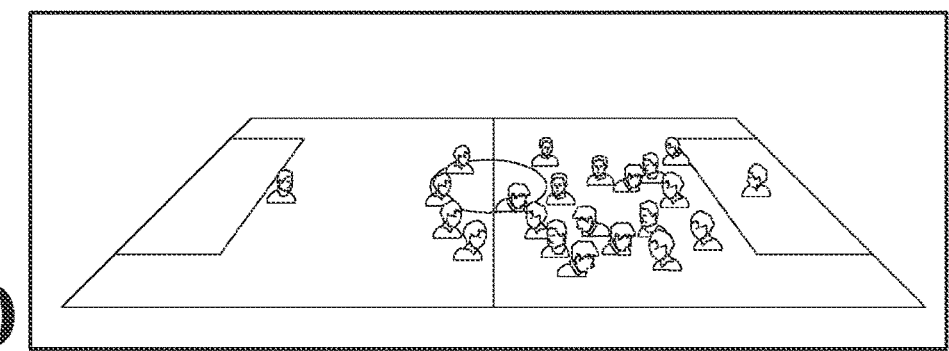

FIG. 10D is an example of the panoramic virtual viewpoint image generated by using the foreground model representing a part of regions of the player that is enlarged at an enlargement ratio of thirtyfold and divided at a division rate of 16%. If the foreground model is enlarged by increasing the enlargement ratio to further check the direction of the line of sight and the facial expression of the player, the foreground models are overlapped. In this case, it is possible to increase the enlargement ratio while suppressing the overlap by also performing the division with the enlargement. Therefore, it is possible to generate an image that allows the viewer to easily check the direction of the line of sight and the facial expression of each player.

As describe above, it is desirable to perform the division on the enlarged foreground model. Therefore, for example, it may be controlled such that it is possible to designate the division rate to less than 1 only in a case where the user designates the enlargement ratio to a value greater than 1.

[Modification 1]

The virtual viewpoint image illustrated in FIG. 10 is an example of the virtual viewpoint image generated by rendering the foreground model and the background model with perspective projection. In a case where the rendering is performed with the perspective projection, an object far from the virtual viewpoint is rendered to be smaller than an object close to the virtual viewpoint, and the virtual viewpoint image with natural appearance is generated. On the other hand, in some cases, the virtual viewpoint image in which the players are displayed in the same size in the entire field is desired for the viewer to check the positions and the formation of the players.

Therefore, in a case where the determined visual field is the panoramic visual field, the virtual viewpoint image generation unit 317 may generate the virtual viewpoint image by performing the rendering by a different method from the method used to generate the virtual viewpoint image viewed from the normal visual field.

For example, in a case where it is determined that the visual field is the normal visual field, the virtual viewpoint image generation unit 317 generates the virtual viewpoint image by rendering the foreground model and the background model with the perspective projection. On the other hand, in a case where it is determined that the visual field is the panoramic visual field, the virtual viewpoint image generation unit 317 generates the virtual viewpoint image by rendering the deformed foreground model with orthographic projection and rendering the background model with the perspective projection. Alternatively, in a case where it is determined that the visual field is the panoramic visual field, the virtual viewpoint image generation unit 317 may generate the virtual viewpoint image by rendering the deformed foreground model and the background model with the orthographic projection.

Figure 11:
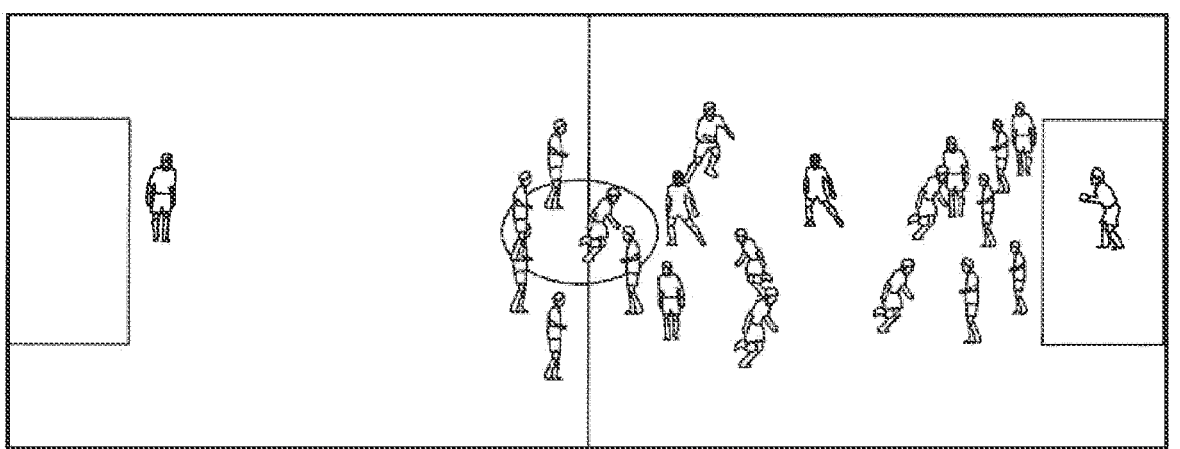
FIG. 11 is an example of the virtual viewpoint image in a case of rendering with orthographic projection.

FIG. 11 is an example of the virtual viewpoint image in a case where the foreground model used in FIG. 10C is rendered with the orthographic projection. With the rendering of the foreground model with the orthographic projection, the phenomenon that the player far from the virtual viewpoint is smaller than the player close to the virtual viewpoint is suppressed even in the panoramic visual field. Therefore, it is possible to generate an image that allows the viewer to easily check the positions and the formation of the distant players far from the virtual viewpoint.

[Modification 2]

It is desirable in the panoramic visual field that the sizes of the objects to be the foreground (players) are as equal as possible over the entire screen. However, with the perspective projection, the size of the player is changed in proportion to the distance from the virtual viewpoint to the player. To deal with this, the visual field determination unit 323 may determine that the visual field is the panoramic visual field in a case where the distance from the virtual viewpoint to a position on the field designated in advance is longer than a predetermined value. With a certain distance from the field, a fluctuation of the positions of the players on the field from the virtual viewpoint is reduced, and a fluctuation of the sizes of the players in the virtual viewpoint image is reduced.

Figure 12A:
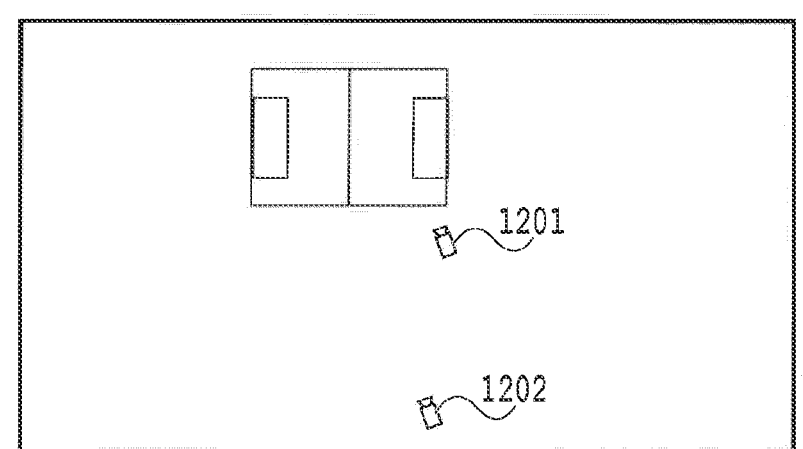
FIGS. 12A to 12C are diagrams describing a method of determining whether it is a panoramic visual field based on the position of a virtual viewpoint.

FIG. 12 is a diagram describing Modification 2. FIG. 12A is a diagram illustrating a positional relationship between the field as the image capturing region and virtual viewpoints 1201 and 1202. The virtual viewpoint 1201 is at a position that is 8 meters from a sideline of the field, and the virtual viewpoint 1202 is at a position that is 100 meters from the sideline of the field.

Figure 12B:
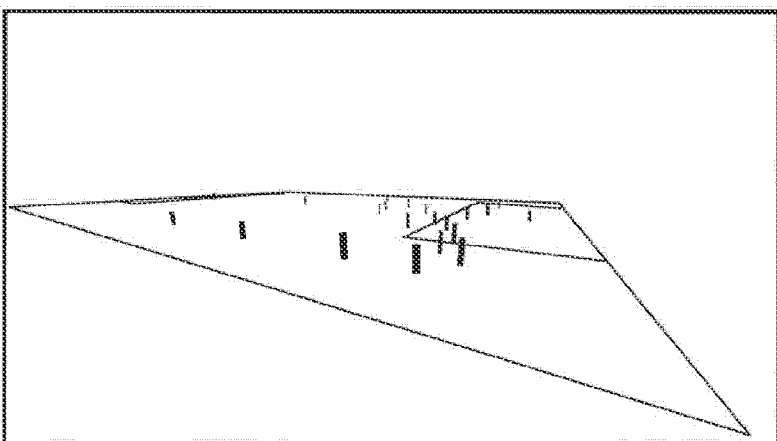
Figure 12C:
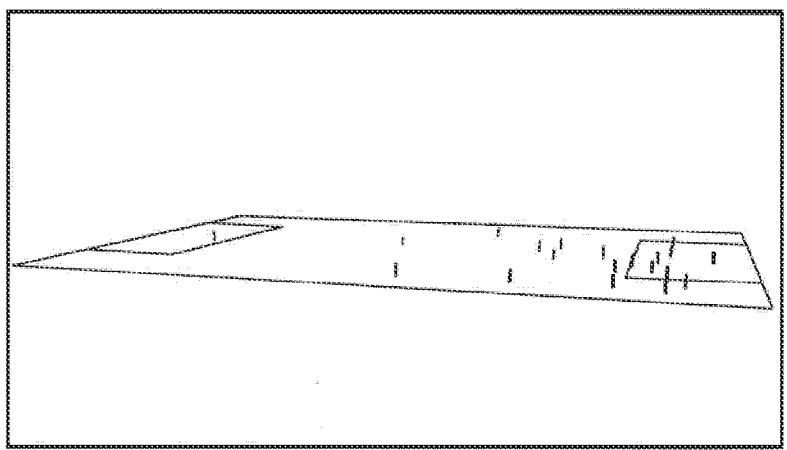

FIG. 12B is a diagram of the virtual viewpoint image viewed from the virtual viewpoint 1201. FIG. 12C is a diagram of the virtual viewpoint image viewed from the virtual viewpoint 1202. Both the virtual viewpoint images in FIGS. 12B and 12C include the four corners of the field. Therefore, in the method described in the main descriptions in Embodiment 1 described above, the visual field indicated by the virtual viewpoint 1201 is also determined as the panoramic visual field. However, in the virtual viewpoint image viewed from the virtual viewpoint 1201, the sizes of the players are fluctuated like the image in FIG. 12B that is the virtual viewpoint image viewed from the virtual viewpoint 1201. For this reason, in the present modification, the visual field from the virtual viewpoint 1201 is not determined as the panoramic visual field. On the other hand, in the present modification, the visual field from the virtual viewpoint 1202 corresponding to FIG. 12C is determined as the panoramic visual field.

The sizes of a distant player and a close player based on the virtual viewpoint are different by 3.8 times in FIG. 12B and are different by 1.3 times in FIG. 12C. The fluctuation of the sizes of the players as the objects to be the foreground is greater in FIG. 12B. For example, assuming that the fluctuation of the sizes of the objects to be the foreground (the players) can be allowed to a maximum of 1.3 times, in a case where the position of the virtual viewpoint is 100 meters away from the sideline of the field, the visual field determination unit 323 may determine that the visual field from the virtual viewpoint is the panoramic visual field.

[Modification 3]

The foreground model holding unit 315 may hold a model of an avatar of the player corresponding to the foreground model and may perform the rendering with the model of the avatar of the player instead of the foreground model to generate the virtual viewpoint image in a case where the visual field is the panoramic visual field. For example, the model of the avatar of the player in which at least a part of regions of the model is enlarged greater than the model generated from the captured image is used to perform the processing to generate the panoramic virtual viewpoint image. Additionally, processing to change the line of sight of the model of the avatar to be the same as the actual line of sight of the player is performed. In a case of changing the line of sight of the model of the avatar, the foreground model of the corresponding player may be used to determine the line of sight.

For example, it is possible to generate the panoramic virtual viewpoint image that allows the viewer to easily identify the player by using the model of the avatar on which a large uniform number is displayed. Additionally, it is possible to generate the panoramic virtual viewpoint image that allows the viewer to easily check the line of sight of the player by increasing the size of the eyes of the avatar.

As described above, according to the present embodiment, it is possible to display the normal visual field and the panoramic visual field on one screen with seamless switching. Additionally, it is possible to display large the object in the virtual viewpoint image of the panoramic visual field so as to be easily checked by the user.

Embodiment 2

In Embodiment 1, it is described that the foreground model is deformed in a case where the setting to validate the deformation is configured, and the user gives the instruction to deform the foreground model. In the present embodiment, a configuration in which the foreground model deformation control unit 324 gives the instruction of whether to perform the deformation without the instruction from the user is described. A different point between the present embodiment and Embodiment 1 is mainly described. The present embodiment has the same configuration and processing as that of Embodiment 1 and the modification of Embodiment 1 unless otherwise stated.

Figure 13:
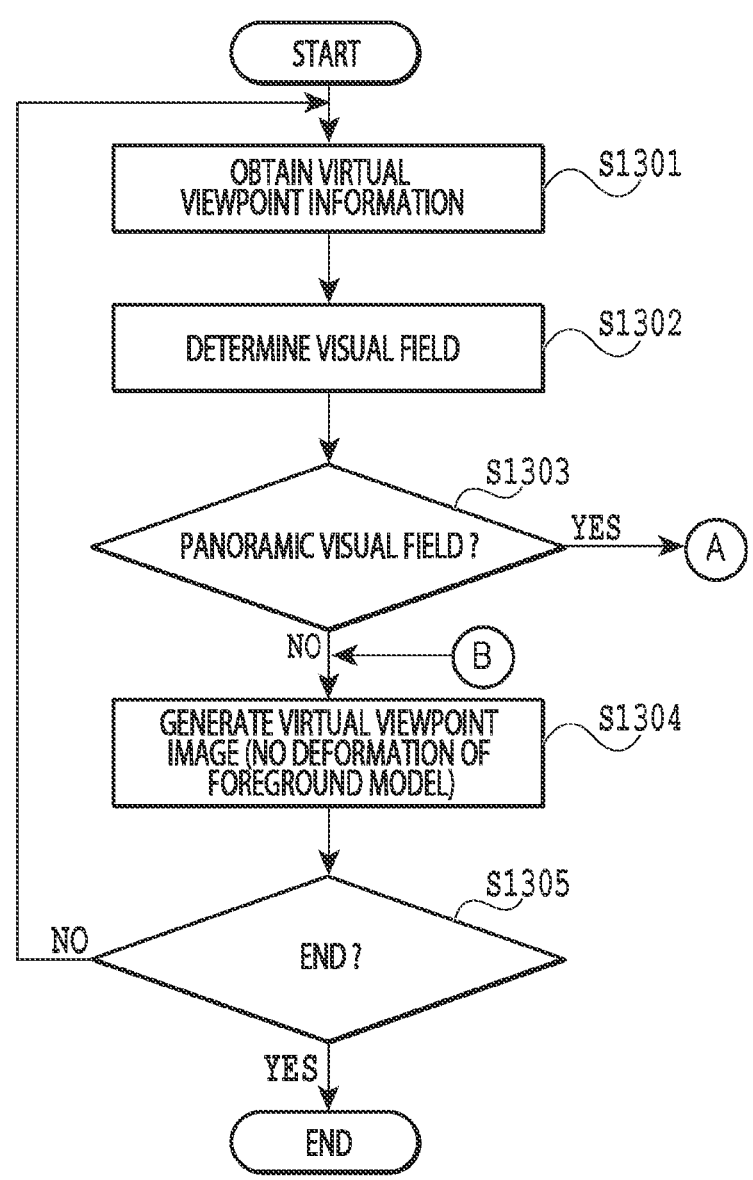
FIG. 13 is a flowchart describing processing to generate the virtual viewpoint image.

FIG. 13 is a flowchart describing a processing procedure of the image processing apparatus 100 corresponding to the normal visual field.

S1301 is a step similar to S802 and S902, and the virtual viewpoint designation unit 321 obtains the virtual viewpoint information on the frame as the processing target.

S1302 is a step similar to S803 and S904, and the visual field determination unit 323 determines the visual field represented by the virtual viewpoint information on the frame as the processing target that is obtained in S1301.

The foreground model deformation control unit 324 of the present embodiment is configured to output the deformation information on the foreground model set in advance to the foreground model deformation unit 316 according to the visual field represented by the virtual viewpoint information. Specifically, in a case where it is determined that the visual field represented by the virtual viewpoint information on the frame as the processing target is the panoramic visual field, the foreground model deformation control unit 324 outputs the deformation information that allows for the deformation to the foreground model deformation unit 316. For example, the deformation information including the value of the enlargement ratio of 7.0 and the value of the division rate of 1 is outputted.

In a case where it is determined that the visual field represented by the virtual viewpoint information on the frame as the processing target is the normal visual field, the foreground model deformation control unit 324 outputs the deformation information including the value of the enlargement ratio of 1 and the value of the division rate of 1 to the foreground model deformation unit 316. In other words, in a case where it is determined that the visual field represented by the virtual viewpoint information is the normal visual field, the deformation information that does not allow for the deformation of the foreground model is outputted.

In S1303, the control unit 320 determines whether the visual field represented by the virtual viewpoint information is changed to the panoramic visual field based on the visual field determined in S1302, and the processing diverges depending on the determination result. If it is determined that the visual field represented by the virtual viewpoint information on the frame as the processing target is still the normal visual field like the previous frame (NO in S1303), the control unit 320 allows the processing to proceed to S1304.

S1304 is a step similar to S805, and the virtual viewpoint image of the normal visual field is generated by using the foreground model that is not deformed with the procedure described in S805. Once the virtual viewpoint image of the processing target is generated in S1304, the processing proceeds to S1305.

In S1305, the control unit 320 determines whether the instruction to end the generation of the virtual viewpoint image is received from the user. If it is determined that the ending instruction is received from the user (YES in S1305), the control unit 320 ends the processing of the present flowchart. If it is determined that the ending instruction is not received from the user (NO in S1305), the control unit 320 returns the processing to S1301 to generate the virtual viewpoint image of the next frame. Then, the processing to generate the virtual viewpoint image of the next frame is performed.

Figure 14:
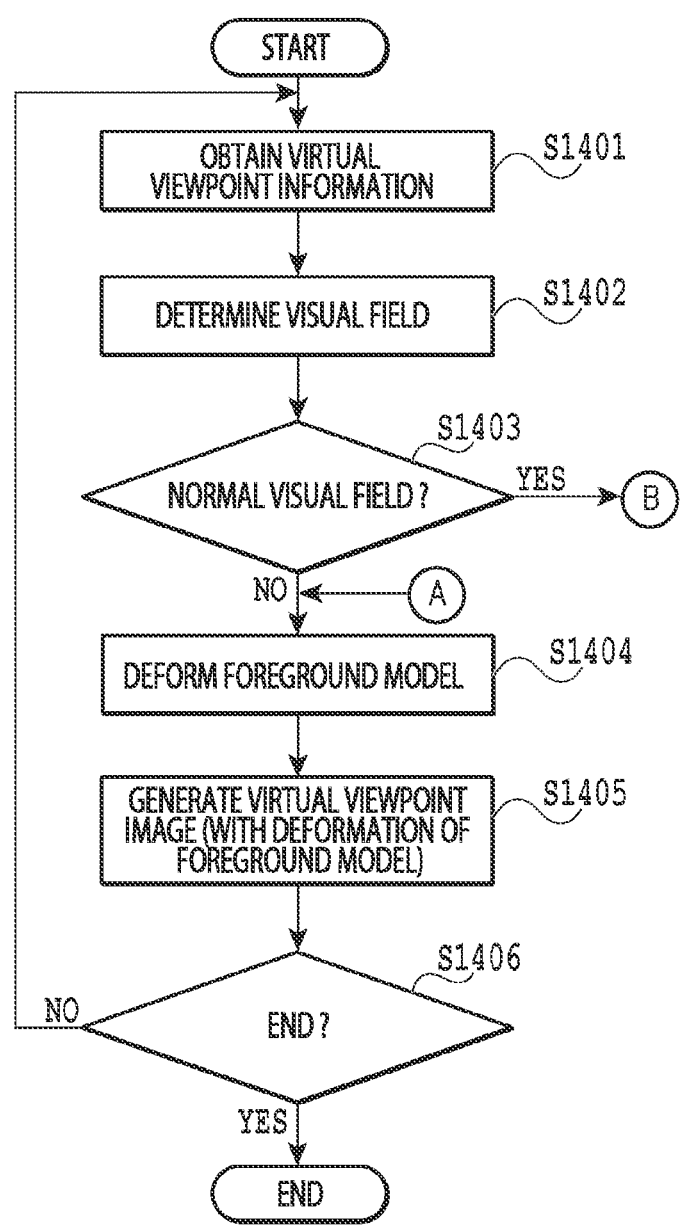
FIG. 14 is a flowchart describing processing to generate the virtual viewpoint image.

On the other hand, if it is determined that the visual field represented by the virtual viewpoint information is changed to the panoramic visual field (YES in S1303), the control unit 320 allows the processing to proceed to S1404 in FIG. 14. The processing in S1404 is described later.

As described above, in the flowchart of FIG. 13, the virtual viewpoint image of the normal visual field is generated in S1301 to S1305 by using the foreground model that is not deformed. Once the visual field is changed to the panoramic visual field, it is determined as YES in S1303, and the processing proceeds to S1404 in FIG. 14.

FIG. 14 is a flowchart describing a processing procedure of the image processing apparatus 100 corresponding to the panoramic visual field.

S1401 is a step similar to S1301, and the virtual viewpoint designation unit 321 obtains the virtual viewpoint information on the frame as the processing target.

S1402 is a step similar to S1302, and the visual field determination unit 323 determines the visual field represented by the virtual viewpoint information on the frame as the processing target that is obtained in S1401.

In S1403, the control unit 320 determines whether the visual field represented by the virtual viewpoint information is changed to the normal visual field based on the visual field determined in S1402, and the processing diverges depending on the determination result. If it is determined that the visual field represented by the virtual viewpoint information on the frame as the processing target is still the panoramic visual field like the previous frame (NO in S1403), the control unit 320 allows the processing to proceed to S1404.

In S1404, the foreground model deformation unit 316 obtains the foreground model corresponding to the frame as the processing target from the foreground model holding unit 315. The foreground model deformation unit 316 then deforms the foreground model of the frame as the processing target at the enlargement ratio and the division rate included in the deformation information outputted from the foreground model deformation control unit 324. The deformed foreground model is outputted to the virtual viewpoint image generation unit 317.

S1405 is a step similar to S907, and the virtual viewpoint image of the panoramic visual field is generated by using the deformed foreground model with the procedure described in S907. Once the virtual viewpoint image of the frame as the processing target is generated in S1405, the processing proceeds to S1406.

In S1406, the control unit 320 determines whether the instruction to end the generation of the virtual viewpoint image is received from the user. If it is determined that the ending instruction is received from the user (YES in S1406), the control unit 320 ends the processing of the present flowchart. If it is determined that the ending instruction is not received from the user (NO in S1406), the control unit 320 returns the processing to S1401 to generate the virtual viewpoint image of the next frame. Then, the processing to generate the virtual viewpoint image of the next frame is performed.

On the other hand, if it is determined in S1403 that the visual field represented by the virtual viewpoint information is changed to the normal visual field (YES in S1403), the control unit 320 allows the processing to proceed to S1304 in FIG. 13. In S1304, as described above, the virtual viewpoint image of the processing target frame is generated by using the foreground model that is not deformed.

As described above, in the flowchart of FIG. 14, the virtual viewpoint image of the panoramic visual field is generated in S1401 to S1406 by using the deformed foreground model. Once the visual field is changed to the normal visual field, it is determined as YES in S1403, and the processing proceeds to S1304 in FIG. 13.

According to the present embodiment described above, it is possible to display the normal visual field and the panoramic visual field on one screen with a smooth transition, and it is possible to display large the foreground model in the panoramic image such that the viewer can easily check the image of each visual field.

Other Embodiments

In the above-described embodiments, it is described that the image processing apparatus 100 generates the three-dimensional model of the foreground and generates the virtual viewpoint image; however, the function included in the image processing apparatus 100 may be implemented by one or more apparatuses different from the image processing apparatus 100. For example, the processing to extract the foreground from the captured image, the processing to generate the three-dimensional model, and the processing to generate the virtual viewpoint image may be performed by different apparatuses, respectively.

Note that, an object of the technique of the present disclosure is achieved also by the following method. A storage medium in which a program code of software implementing the function of the above-described example is recorded is supplied to a system or an apparatus. A computer (or a CPU or an MPU) of the system or the apparatus reads the program code stored in the storage medium to execute.

In this case, the function of the above-described embodiment is implemented by the program code itself read from the storage medium, and the storage medium storing the program code configures the present invention.

As the storage medium to supply the program code, for example, a flexible disk, a hard disk, an optical disk, a magnetooptical disk, a CD-ROM, a CD-R, a magnetic tape, a non-volatile memory card, a ROM, and so on may be used.

Additionally, there is also included a case where the function of the above-described embodiment is implemented by the following processing. Based on an instruction of the program code read by the computer, an operating system (OS) and the like operating on the computer performs a part of or all the actual processing.

Moreover, there is also included a case where the function of the above-described embodiment is implemented by the following processing. First, the program code read from the storage medium is written into a memory provided in a function expansion board inserted in the computer and a function expansion unit connected to the computer. Next, based on an instruction of the program code, a CPU and the like provided in the function expansion board and the function expansion unit performs a part of or all the actual processing.

According to the present disclosure, it is possible to generate a panoramic virtual viewpoint image that allows a user to easily check an object.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-004979 filed Jan. 17, 2023, which are hereby incorporated by reference wherein in their entirety.

What is claimed is:

1. An image processing apparatus comprising:
one or more memories storing instructions; and
one or more processors executing the instructions to:
obtain information on a virtual viewpoint to generate a virtual viewpoint image, the virtual viewpoint image being an image of an object viewed from the virtual viewpoint, the object included in an image capturing region of an image capturing apparatus;
obtain enlarged three-dimensional shape data representing the object in which at least a part of regions is greater than that of original three-dimensional shape data generated based on images obtained by image capturing by the image capturing apparatus; and
generate the virtual viewpoint image based on the enlarged three-dimensional shape data in a case where a visual field represented by the information is a panoramic visual field.

2. The image processing apparatus according to claim 1, wherein
the image capturing region is a field in which a competition is held, and the object is a player who is present on the field.

3. The image processing apparatus according to claim 1, wherein
the one or more processors execute the instructions to further determine whether the visual field represented by the information is the panoramic visual field.

4. The image processing apparatus according to claim 3, wherein
in a case where the visual field represented by the information includes a plurality of positions in the image capturing region, it is determined that the visual field represented by the information is the panoramic visual field.

5. The image processing apparatus according to claim 3, wherein in a case where a resolution at a predetermined position in the image capturing region derived based on the information is greater than a predetermined value, it is determined that the visual field represented by the information is the panoramic visual field.

6. The image processing apparatus according to claim 3, wherein in a case where a distance from a predetermined position in the image capturing region to the virtual viewpoint is greater than a predetermined value, it is determined that the visual field represented by the information is the panoramic visual field.

7. The image processing apparatus according to claim 3, wherein in a case where it is determined that the visual field represented by the information is the panoramic visual field, the virtual viewpoint image is generated based on the enlarged three-dimensional shape data representing the object on which enlargement is performed, and in a case where it is determined that the visual field represented by the information is a visual field other than the panoramic visual field, a virtual viewpoint image is generated based on the original three-dimensional shape data representing the object on which the enlargement is not performed.

8. The image processing apparatus according to claim 1, wherein the one or more processors execute the instructions to further generate the original three-dimensional shape data representing a three-dimensional shape of the object on which enlargement is not performed based on the images obtained by the image capturing by the image capturing apparatus.

9. The image processing apparatus according to claim 8, wherein the enlarged three-dimensional shape data is three-dimensional shape data representing the entirety of the object enlarged compared with the three-dimensional shape represented by the original three-dimensional shape data, and the enlarged three-dimensional shape data is obtained by at least performing deformation processing on the original three-dimensional shape data so as to enlarge the object based on a designated enlargement ratio.

10. The image processing apparatus according to claim 8, wherein the enlarged three-dimensional shape data is three-dimensional shape data representing a part of regions of the enlarged object, and the enlarged three-dimensional shape data is obtained by performing processing to enlarge the object based on a designated enlargement ratio and additionally performing deformation processing to divide the enlarged object at a designated division rate on original the three-dimensional shape data.

11. The image processing apparatus according to claim 9, wherein the one or more processors execute the instructions to further execute deformation control to switch between first setting to validate the deformation processing and second setting to invalidate the deformation processing, wherein, in a case of the first setting, an instruction of the deformation processing is received from a user and the virtual viewpoint image is generated based on the enlarged three-dimensional shape data, and in a case of the second setting, the instruction of the deformation processing is not received from the user and a virtual viewpoint image is generated based on the original three-dimensional shape data.

12. The image processing apparatus according to claim 11, wherein in the deformation control, in a case where the visual field represented by the information is the panoramic visual field, it is switched to the first setting, and in a case where the visual field represented by the information is a visual field other than the panoramic visual field, it is switched to the second setting.

13. The image processing apparatus according to claim 9, wherein the deformation processing is performed such that the three-dimensional shape of the object is enlarged according to the designated enlargement ratio based on a reference point that is a center of a bottom surface of a bounding box surrounding the three-dimensional shape represented by the original three-dimensional shape data.

14. The image processing apparatus according to claim 9, further comprising:

an operation unit for a user to perform designation, wherein the operation unit at least includes a first zoom switch to designate a focal length from the virtual viewpoint and a second zoom switch to designate the enlargement ratio.

15. The image processing apparatus according to claim 1, wherein the virtual viewpoint image is generated by rendering the enlarged three-dimensional shape data with orthographic projection.

16. The image processing apparatus according to claim 1, wherein the virtual viewpoint image is a moving image, and in a case where the virtual viewpoint images including the object represented by the enlarged three-dimensional shape data are generated as frames, the virtual viewpoint images are generated such that a transition from the panoramic visual field to a visual field other than the panoramic visual field is not performed.

17. The image processing apparatus according to claim 1, wherein the virtual viewpoint image is generated by further using three-dimensional shape data representing a background on which enlargement is not performed.

18. The image processing apparatus according to claim 1, wherein three-dimensional shape data of an avatar representing the object in which at least a part of regions is enlarged is obtained, and in a case where the visual field represented by the information is the panoramic visual field, a virtual viewpoint image including the avatar is generated by using the three-dimensional shape data of the avatar.

19. An image processing method comprising:

obtaining information on a virtual viewpoint to generate a virtual viewpoint image, the virtual viewpoint image being an image of an object viewed from the virtual viewpoint, the object included in an image capturing region of an image capturing apparatus;

obtaining enlarged three-dimensional shape data representing the object in which at least a part of regions is greater than that of original three-dimensional shape data generated based on images obtained by image capturing by the image capturing apparatus; and generating the virtual viewpoint image based on the enlarged three-dimensional shape data in a case where a visual field represented by the information is a panoramic visual field.

20. A non-transitory computer readable storage medium storing a program which causes a computer to perform an image processing method, the image processing method comprising:

obtaining information on a virtual viewpoint to generate a virtual viewpoint image, the virtual viewpoint image being an image of an object viewed from the virtual viewpoint, the object included in an image capturing region of an image capturing apparatus;

obtaining enlarged three-dimensional shape data representing the object in which at least a part of regions is greater than that of original three-dimensional shape data generated based on images obtained by image capturing by the image capturing apparatus; and generating the virtual viewpoint image based on the enlarged three-dimensional shape data in a case where a visual field represented by the information is a panoramic visual field.

\* \* \* \* \*